Figure 1:
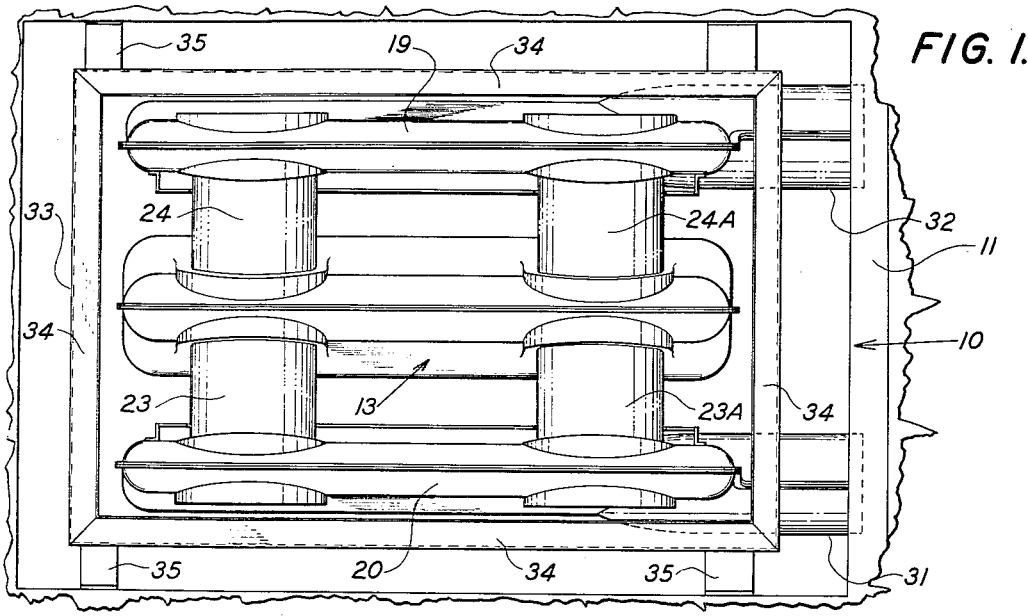

May 15, 1956 K. L. BEDELL ET AL 2,745,398
FLOOR FURNACE
Filed Sept. 26, 1952

INVENTORS.
KARL L. BEDELL
JOHN H. HOLLINGSWORTH
BY
James B. Christie
ATTORNEY

United States Patent Office 2,745,398
Patented May 15, 1956

2,745,398

FLOOR FURNACE

Karl L. Bedell, Pasadena, and John H. Hollingsworth, Altadena, Calif., assignors to Holly Manufacturing Company, Pasadena, Calif., a corporation of California Application September 26, 1952, Serial No. 311,626

2 Claims. (Cl. 126—116)

This invention is concerned with floor furnaces and provides novel floor furnace structures which permit an increase in heat output without exceeding allowable metal or air temperatures.

The conventional floor furnace is a gas burning heating appliance, which is set into a floor and is open at the top to discharge hot air into a room or the like. The conventional floor furnace has a sheet metal box which acts as an outer casing. This box is open at the top and the top is set flush with the floor surface in the space to be heated. A heat exchanger is disposed in the box. The heat exchanger has a combustion chamber which is fired from below (usually with gas) and is connected underneath the floor to a flue system. Ordinarily the heat exchanger is surrounded by a metal liner or inner casing open at the bottom and top and spaced away from the combustion chamber and the outer casing. Room air flows downward in the floor furnace in the space between the inner and outer casings and then upward within the inner casing over the heat exchanger, discharging through the top of the floor heater into the space to be heated.

Certain requirements for floor heaters are specified by the American Gas Association and nationally recognized. The specifications establish maximum temperatures for the walls of the heat exchanger and also specify a maximum allowable temperature for the hot air discharged from the appliance. These maximums are set in the interest of safety, but inherently impose limitations on the amount of heat that can be generated in a given floor furnace.

We have developed a floor heater in which the heat output in terms of size of the furnace, can be increased markedly over the heat output of heretofore customary floor furnaces, without exceeding the maximum allowable metal temperatures or maximum allowable air temperatures. In accordance with our invention, the combustion chamber is a hollow wedge-shaped structure with the thin portion of the chamber uppermost. The chamber is fired from below by any suitable means, say a gas burner, and combustion occurs in the chamber. The chamber is made of sheet metal, say sheet steel, and we prefer to coat this combustion chamber with a ceramic layer, thus increasing the maximum allowable temperature for the metal of the chamber.

At least one hollow radiator is disposed beside and spaced from the wedge-shaped combustion chamber inside the housing and is connected to the upper portion of the combustion chamber by at least one conduit, say a connector collar. The lower portion of the radiator has a flue outlet, preferably on its end. This flue outlet passes through the outer casing and is connected to a flue in conventional manner. Preferably the structure of our invention has two hollow slab-shaped radiators, one on either side of the combustion chamber, each radiator being connected to the combustion chamber near its top by a plurality of connector collars. The radiators are spaced from the combustion chamber so that hot air can rise to the top or register of the furnace between the radiator and the combustion chamber. In the preferred structure, the radiators or wing sections of our heat exchanger are disposed closer to the wedge-shaped radiator and inner casing at the bottom than at the top, so as to provide air passages on opposite sides of the radiators of increasing area from bottom to top.

We have found that the inverted wedge-shaped combustion chamber can be heated much higher than conventional types, without forming a "hot spot" in the space directly above the combustion chamber. With the wedge-shaped combustion chamber the heat radiating surface near the top is small, which may account for the fact that the air which moves upward directly above the chamber is not heated excessively.

The establishment of a uniform temperature gradient across the space directly overlying the floor furnace of our invention is furthered if the radiator sections are disposed closer to the combustion chamber at the bottom than at the top to provide air passages of increasing cross section from bottom to top. This may be due to the fact that the rising air expands as it is heated and occupies more space. Whatever the explanation is, the fact remains that our floor furnace can be operated with a much higher rate of heat transfer per square foot of heat exchanger surface than floor furnaces heretofore available.

Figure 2:
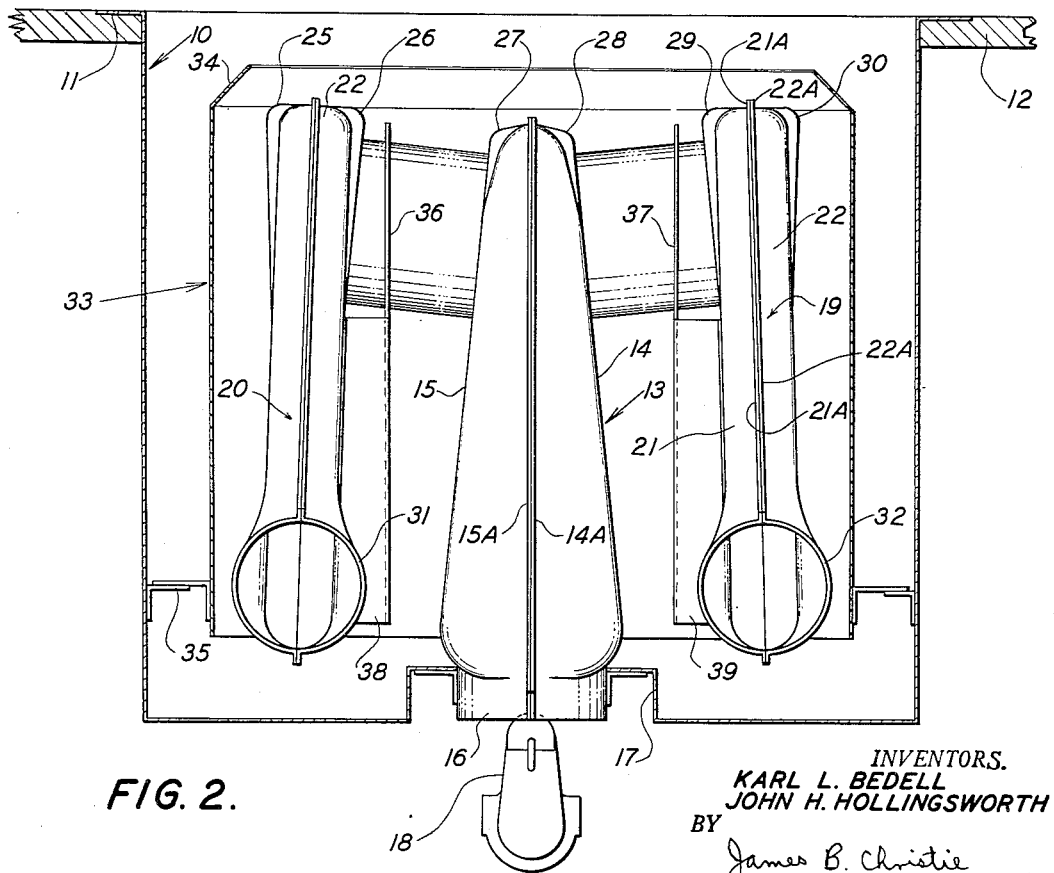

Our invention is explained in detail in the following with reference to the accompanying drawings in which:

Fig. 1 is a plan view of a presently preferred form of the floor heater of our invention; and Fig. 2 is an elevation, partly in section, of the floor furnace of Fig. 1.

The apparatus illustrated comprises a box-shaped housing or outer casing 10 open at the top. The housing is made of sheet metal and has vertical sides and a horizontal bottom. Around the top of the housing is a mounting flange 11 which supports the housing flush with the top of a floor 12 of the space to be heated. A conventional grating (not shown) may be disposed across the top.

A wedge-shaped hollow combustion chamber 13 is disposed centrally inside the upper casing. It is formed of opposed sheet steel stampings 14, 15 joined at the center by welded flanges 14A, 15A. Preferably the combustion chamber thus formed has a thin adherent ceramic coating on its inner and outer surfaces. This permits metal temperatures to be increased. The bottom 16 of the combustion chamber is open and the chamber rests on an elevated portion 17 of the bottom of the housing. An elongated gas burner 18 is disposed longitudinally of the combustion chamber outside the housing and gas from the burner mixes with and burns in atmospheric air drawn into the bottom of the combustion chamber.

A pair of hollow slab-shaped radiators 19, 20 of substantially uniform thickness from top to bottom are disposed respectively at the sides of the combustion chamber and are spaced from the combustion chamber and also from the sides and top and bottom of the housing. The radiators are likewise formed of opposed sheet metal stampings 21, 22 joined together by welded flanges 21A, 22A.

Each radiator is connected to the upper portion of the wedge-shaped combustion chamber by two connector collars 23, 23A, 24, 24A. These collars are short cylindrical pipe sections which are welded to the radiators and the combustion chamber at their ends.

The combustion chamber, the radiators and the connector collars together constitute the heat exchanger of the appliance.

To simplify the joining of the connector collars to the radiators and to the combustion chamber, the stampings which form the combustion chamber and the radiators have expanded portions 25, 26, 27, 28, 29, 30. The outside expanded portions 25, 30 on the radiators are not connected to the collars, and have no useful purpose, save that in the interests of standardization the two stampings which form the radiators can be made identical.

Because of the expanded portions to which they are connected, the connector collars can be constructed as simple round tubes with their ends perpendicular to their respective axes. Thus the joints of the connector collars with both radiators and combustion chamber are simple circles.

The connector collars project perpendicular to the sides of the wedge-shaped combustion chamber and slant slightly upward toward the radiators. The expanded portions of the radiators are so formed that the inside faces of the two radiators are not parallel to the neighboring sides of the combustion chamber. Thus the tops of the radiators are further away from the sides of the combustion chamber at the top than they are at the bottom. This provides air passages of increasing cross section toward the top of the furnace.

The two radiators are provided respectively with flue outlets 31, 32 formed at their lower ends and projecting horizontally through one end of the housing. These flue outlets are connected to a flue (not shown) underneath the floor in a conventional manner.

A conventional inner casing 33 is disposed around the heat exchanger of the furnace. It consists of a sheet metal box open at the top and bottom, with vertical walls, except at the top where each wall slants inward in a short frusto pyramidal portion 34 beginning at the top of the radiators and extending about half way up to the floor level. The inner casing extends approximately to the bottom of the radiators and is suspended from the outer casing by hangers 35. The inner casing is cut away in the lower portion to permit it to be dropped down over the flue outlets. The spaces at the sides of the radiators between the radiators and the inner casing are of larger cross section at the top than at the bottom. This aids in avoiding "hot spots" in the air discharged from the furnace.

A pair of sheet metal reflectors or guards 36, 37 are disposed respectively between the radiators and the combustion chamber. These are vertical metal sheets which are spaced from radiator and combustion chamber and are fastened respectively to the adjacent radiator by flanges 38, 39. The upper portion of each sheet is cut away to permit it to be slipped upwardly around the connector collars. These reflectors tend to prevent heat radiated by the combustion chamber from heating the radiators, thus improving the overall heat transfer of the apparatus.

In the operation of the apparatus illustrated, air from the room flows downward in the space between the inner and outer casing and then upwardly within the confines of the inner casing in the spaces not occupied by the heat exchanger. The air is thus heated and is discharged into the space above the floor heater, say into a room.

When the combustion chamber is made of untreated sheet steel, the maximum wall temperature of the combustion chamber is 805° F. above room temperature. When the combustion chamber is coated with a ceramic layer, the temperature of the combustion chamber wall may be raised to 1030° F. above room temperature. In either case, the structure of the invention permits operations at a much higher rate of heat transfer per square foot of heat exchanger surface than would be the case if the wedge-shaped combustion chamber were not employed. As already indicated, further advantage accrues in making the space between the radiator and the combustion chamber of increasing cross section from bottom to top.

We claim:

1. In a floor furnace, the combination which comprises a housing having vertical side walls and a bottom wall, said housing adapted to be disposed directly below the floor of a space to be heated, the top of the housing being open and adapted to be in direct communication with the space, a heater having an upright hollow wedge-shaped combustion chamber disposed in the housing with the thin portion of the wedge uppermost and directly below the open top of the housing, means for burning fuel in the combustion chamber, a hollow slab-shaped radiator disposed at a side of the combustion chamber and spaced therefrom, at least one conduit connecting the upper portion of the combustion chamber to the upper portion of the radiator, an inner casing having vertical side walls located between the radiator and the adjacent sides of the housing and spaced from the sides of the housing and the radiator, said radiator being of substantially uniform thickness from top to bottom thereof, the side walls of said radiator being inclined relative to the adjacent side walls of the inner casing and the adjacent side of said combustion chamber to form air passages of upwardly increasing cross-sectional area on opposite sides thereof, and a conduit connected to the lower portion of the radiator to exhaust products of combustion from the heat exchanger.

2. In a floor furnace, the combination which comprises a housing having vertical side walls and a bottom wall, said housing being disposable in a floor of a space to be heated and having an open top adapted to be in direct communication with the space, a heater mounted in the housing and having an upright hollow wedge-shaped combustion chamber with the thin portion of the wedge disposed uppermost and directly below the open top of the housing, means for burning fuel in the combustion chamber, hollow slab-shaped radiators disposed respectively at the two sides of the combustion chamber and spaced therefrom, conduits connecting the upper portion of the wedge-shaped combustion chamber respectively to the upper portions of the respective radiator sections, conduits connected respectively to the lower portions of the radiators to exhaust products of combustion from the heater, an inner casing having vertical side walls disposed between the radiators and the adjacent sides of the housing and spaced respectively from the sides of the housing and the sides of the radiators, the radiators being of substantially uniform thickness from top to bottom, and the side walls of each radiator being inclined relative to the adjacent side wall of the inner casing and the adjacent side of the combustion chamber to form air passages of upwardly increasing cross-sectional area on opposite sides of the radiator.

References Cited in the file of this patent

UNITED STATES PATENTS

| | | |
|---|---|---|
| 1,991,704 | Schellhammer et al. | Feb. 19, 1935 |
| 2,089,969 | Kuenhold | Aug. 17, 1937 |
| 2,387,939 | Olds | Oct. 30, 1945 |
| 2,474,417 | Gillen | June 28, 1949 |
| 2,584,694 | Giwosky | Feb. 5, 1952 |